United States Patent [19]

Arave

[11] 4,020,692

[45] May 3, 1977

[54] ULTRASONIC THERMOMETER ISOLATION STANDOFFS

[75] Inventor: Alvin E. Arave, Idaho Falls, Idaho

[73] Assignee: The United States of America as represented by the United States Energy Research and Development Administration, Washington, D.C.

[22] Filed: Sept. 26, 1975

[21] Appl. No.: 617,125

[52] U.S. Cl. .............................................. 73/339 A
[51] Int. Cl.$^2$ ...................................... G01K 11/24
[58] Field of Search .............. 73/339 A, 67.2–67.4, 73/560, 67, 67.1

[56] References Cited

UNITED STATES PATENTS

| 2,486,984 | 11/1949 | Rowe | 73/67.2 |
| 3,538,750 | 11/1970 | Lynnworth | 73/67.1 X |
| 3,633,423 | 1/1972 | Bell | 73/339 A |
| 3,633,424 | 1/1972 | Lynnworth et al. | 73/339 A |

FOREIGN PATENTS OR APPLICATIONS 1,011,472  12/1965  United Kingdom ................. 73/67.2

OTHER PUBLICATIONS

Tasman, H. A. et al. "The Ultrasonic Thermometer . . . In High Temperature–High Pressures, vol. 4, pp. 477–481 (1972).

*Primary Examiner*—James J. Gill
*Attorney, Agent, or Firm*—Dean E. Carlson; Arthur A. Churm; Robert J. Fisher

[57] ABSTRACT

A method is provided for minimizing sticking of the transmission line to the protective sheath and preventing noise echoes from interfering with signal echoes in an improved high temperature ultrasonic thermometer which includes an ultrasonic transmission line surrounded by a protective sheath. Small isolation standoffs are mounted on the transmission line to minimize points of contact between the transmission line and the protective sheath, the isolation standoffs serving as discontinuities mounted on the transmission line at locations where a signal echo is desired or where an echo can be tolerated. Consequently any noise echo generated by the sticking of the standoff to the protective sheath only adds to the amplitude of the echo generated at the standoff and does not interfere with the other signal echoes.

6 Claims, 3 Drawing Figures

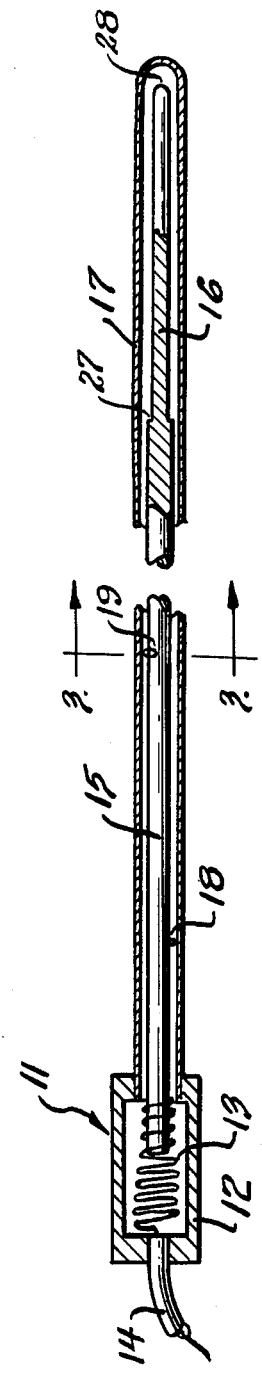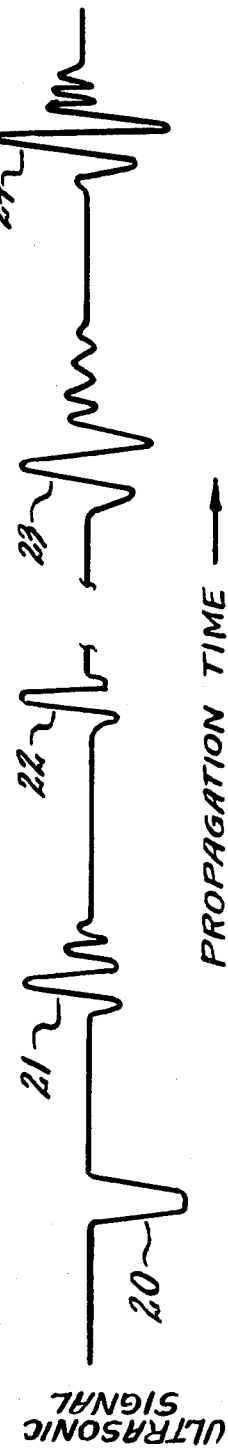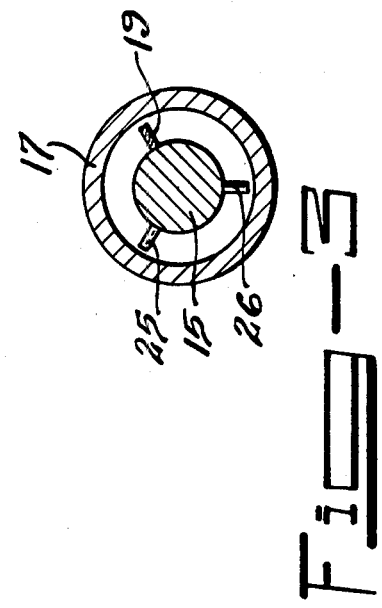

ULTRASONIC THERMOMETER ISOLATION STANDOFFS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the measurement of high temperatures and is particularly concerned with the measurement of the very high temperatures encountered in the core of a nuclear reactor. More particularly the present invention relates to the determination of temperatures employing a high temperature ultrasonic thermometer and is specifically directed to an improved design which prevents noise echoes from interfering with the signal echo of the ultrasonic thermometer.

The research and development as well as the operation of new energy sources require the determination of temperatures including extremely high temperatures which cannot be measured employing common thermometry techniques. In nuclear reactors, and particularly experimental reactors, it is extremely desirable and necessary to measure the temperature at various points within the reactor including various points within the reactor core. While thermocouples are commonly employed for the determination or the measurement of temperatures in many locations about and within the reactor, extremely high temperatures such as are reached in the nuclear reactor core preclude the use of thermocouples which are limited at very high temperatures by electrical shunting effects in the insulation material. Consequently, the extremely high temperatures reached in the core have been measured by the use of ultrasonic thermometers.

An ultrasonic thermometer utilizes the temperature dependent ultrasonic propagation velocity in a thin wire sensor as a temperature transducing mechanism. Since the propagation velocity is temperature dependent, the device is calibrated and the temperature is determined by measuring the propagation time between the signal echoes generated at discontinuities placed along the sensor and a refractory metal wire ultrasonic transmission line, the propagation time of the ultrasonic signal along the sensor and the transmission line being directly related to the temperature.

A high temperature ultrasonic thermometer has been employed in tests being cnducted in the Loss of Fluid Test (LOFT) and Power Burst Facility (PBF) reactors at the Idaho National Engineering Laboratory located at the National Reactor Testing Station in southeastern Idaho. These tests have included the measurement of the extremely high temperatures reached at the fuel rod centerlines. For these fuel rod centerline determinations, a specific high temperature ultrasonic thermometer was designed which included an ultrasonic transducer, a refractory metal wire ultrasonic transmission line with an ultrasonic sensor at the end of the transmission line and a protective sheath surrounding the transmission line and sensor. Since the length of the sensor is known and the propagation velocity is temperature dependent, the device can be calibrated for temperature as a function of propagation velocity. The reflections of the ultrasonic pulses that travel the known distance are used to determine the average propagation velocity in the sensor and hence determine the average temperature over the length of the sensor wire.

Ideally, the reflection of the ultrasonic waves occurs from the discontinuity where the sensor wire is attached to the lead-in transmission wire and from the end of the sensor wire. However, in actual practice it has been found that at the extremely high temperatures encountered in these measurements and particularly at temperatures above approximately 1600° C, the transmission line often diffusion bonds or "sticks" to the protective sheath at points where they make contact. The "sticking" is very troublesome because it produces an acoustic impedance mismatch and correspondingly, an ultrasonic echo. This noise echo can interfere with the measurement of the propagation time between the sensor echoes. In fact, since an echo will be generated at any discontinuity along the transmission line, including those produced where the transmission line bonds or sticks to the protective sheath, noise echoes can be generated which at times can even mask out the signal echoes. Since tests are to be conducted at temperatures in excess of 2500° C, a satisfactory solution to this bonding or sticking problem must be found.

A more complete description of the ultrasonic thermometer as well as the sticking problem is contained in U.S. AEC Report ANCR-1091, "High Temperature Ultrasonic Thermometer In-Reactor Fuel Rod Centerline Temperature Test Results," coauthored by the present applicant which report is incorporated herein by reference as though fully set forth.

One proposed solution to the sticking problem has been to use a spacer wire between the transmission line and the protective sheath. This spacer wire is helically wrapped about the transmission line. However, it has been found that the spacer wire sticks to the transmission line and protective sheath creating a line contact between the transmission line and the sheath which generates an exceptionally undesirable broad noise echo. Consequently, it is an object of the present invention to provide an improved design and a high temperature ultrasonic thermometer which will minimize the sticking of the transmission line to the sheath.

It is another object of the present invention to provide an improved design to prevent noise echoes from interfering with the desired signal echoes.

It is another object of the present invention to provide a method for minimizing the points of contact between the transmission line and the protective sheath.

Other objects and advantages of the present invention will become apparent upon reading the following description and with particular reference to the specific embodiment described hereinbelow.

SUMMARY OF THE INVENTION

In accordance with the present invention small isolation standoffs are mounted on the transmission line of a high temperature ultrasonic thermometer, which includes an ultrasonic transmission line surrounded by a protective sheath, to minimize the points of contact between the transmission line and sheath thereby minimizing the sticking of the transmission line to the protective sheath. The isolation standoffs are mounted on the transmission line at locations where a signal echo is desired or where a noise echo can be tolerated. Consequently, the isolation standoffs prevent noise echoes from interfering with signal echoes since the noise echo generated by bonding of the standoff to the sheath only adds to the amplitude of the signal echo generated at the standoff itself.

BRIEF DESCRIPTION OF THE DRAWINGS

An understanding of the features in the operation of the present invention can be obtained from reading the following description and with reference to the drawings in which:

FIG. 1 is a sectional view of a specific embodiment of the present invention;

FIG. 2 is a graphic representation of the ultrasonic signal which can be obtained from the specific embodiment illustrated in FIG. 1; and FIG. 3 is a cross-sectional view taken along the line 3—3 of FIG. 1.

DESCRIPTION OF THE INVENTION

While the invention is hereinafter described in connection with a particular specific embodiment, it should be understood that it is not intended to limit the invention to only that specific embodiment, but it is intended to cover all alternatives, modifications and equivalents as may be included within the spirit and scope of the invention as defined by the appended claims.

Turning now to FIG. 1, there is illustrated a specific embodiment of a high temperature ultrasonic thermometer embodying the features of the present invention. The ultrasonic thermometer includes a transducer indicated generally at 11 which includes a transducer housing 12 and coil 13. Power for operation of the transducer is supplied such as through cable 14. The coil of the transducer is coupled with ultrasonic transmission line 15 which is integral with the ultrasonic sensor 16 located at the end of transmission line 15 opposite the transducer 11. The transmission line 15 and sensor 16 are surrounded by a protective sheath 17 and spaced therefrom. Small isolation standoffs, such as 18 and 19 illustrated in FIG. 1, are mounted on the transmission line 15 and serve to minimize the points of contact between the transmission line 15 and protective sheath 17. Since the isolation standoffs create discontinuities along the transmission line which will generate an ultrasonic signal echo, it is highly preferred that the small isolation standoffs 18 and 19 be mounted on transmission line 15 at locations where a signal echo is desired or a noise echo can be tolerated.

An understanding of the operation of the ultrasonic thermometer and the improved results obtained by incorporation of the features of the present invention can best be obtained by referring to FIG. 2 in conjunction with FIG. 1 where there is shown a graphic representation of the type of ultrasonic signal which will be obtained from the ultrasonic thermometer as illustrated in FIG. 1. An ultrasonic signal represented by the pulse 20 is transmitted from the transducer along transmission line 15. When the ultrasonic pulse encounters a first discontinuity on the transmission line, such as the isolation standoff 18, a signal echo represented at 21 will be generated. Similarly, when the pulse reaches the discontinuity on the transmission line 15 created by the isolation standoff 19, a second signal pulse 22 will be generated. The signals of interest for the determination of the temperature are the echo signal 23 generated by the discontinuity at the junction 27 between the transmission line 15 and the sensor 16 and the signal echo 24 generated at the discontinuity formed by the end 28 of the sensor 16. Since the time of propagation of the signal from the discontinuity at the junction 27 of the sensor and the transmission line and the end 28 of the sensor is dependent upon the temperature along the length of the sensor 16, the propagation time between signals 23 and 24 can be used to determine the average temperature over the length of the sensor 16.

In the absence of isolation standoffs, such as 18 and 19, the transmission line or the sensor may come in contact with the protective sheath 17 and, at elevated temperatures such as above approximately 1600° C, the transmission line can bond to the protective sheath at the points of contact. Noise echoes will consequently be generated by the discontinuities created at these sticking points and, because the bonding may occur randomly at any point along the length of the transmission line and sensor, the noise echo generated by the discontinuities may interfere with or even mask out the signal echoes.

Since the isolation standoffs mounted on the transmission line create discontinuities which will likewise generate a signal, it is preferred that the isolation standoffs be mounted on the transmission line at locations where a signal echo is desired or a noise echo can be tolerated. Consequently, the echoes generated by these discontinuities will give a signal from a known location. In addition, any noise echo which is then generated by the sticking of the standoff to the protected sheath will only add to the amplitude of the signal echo generated at the standoff rather than creating an additional noise echo. Since the standoffs will prevent sticking of the transmission line to the sheath at points other than the standoffs, the points of contact between the transmission line and the sheath are minimized and random noise echoes are prevented.

While the isolation standoffs can be any of a variety of materials and forms, it has been found that small sections of thin wire are particularly adaptable for use as the standoffs. In one specific embodiment of the invention employing small sections of thin wire for the isolation standoffs, the thin wire standoffs are mounted on the transmission line perpendicular thereto.

Referring to FIG. 3 there is shown another preferred aspect of a specific embodiment of the present invention. FIG. 3 is a cross-sectional view through isolation standoff 19 which shows the transmission line 15 surrounded by and spaced from the protective sheath 17. Small isolation standoffs, 25, 26 and 19 are seen as being composed of thin wire, standoffs 25 and 26 not being visible in the segmented drawing of FIG. 1. These standoffs are mounted on the transmission line 15 perpendicular to the axis thereof and the adjacent standoffs, such as 25, 19 or 26, 25 are mounted about the circumference of transmission line 15 approximately 120° apart. As shown in FIGS. 1 and 3 the isolation standoffs are spaced apart along the length of the transmission line and the adjacent standoffs, such as 25 and 19, in addition to being spaced apart along the length of the transmission line 15 are spaced apart approximately 120° about the circumference of the transmission line. Alternatively, a plurality of standoffs can be mounted circumferentially spaced apart at each given distance along the length of transmission line 15.

While the above described isolation standoffs are preferred, it should be understood that the present invention is not limited thereto, but is equally applicable to other configurations or standoffs which will provide point or minimum contact between the sheath, standoffs, transmission line and sensor element.

For example, another possible isolation standoff is a square shaped washer with a square central opening. The square shape and square opening would provide for point contact between the standoffs and the sheath at the four exterior corners of the square washer and approximately point contact between the transmission line and the washer along each of the four interior sides of the washer forming the central square opening. Another possibility is to grow crystalline hairs such as tungsten hairs, for the standoffs at locations along the transmission line. Such tungsten hairs would function very similarly to the standoffs composed of sections of thin wire.

Although the thin sections of wire can be mounted on the transmission line in any of a variety of manners, welding of the wires to the transmission line has been found to be an acceptable technique. Resistance welding may be used, but it has been found that laser welding is a particularly convenient method for mounting the standoffs on the transmission line and is therefore preferred.

Various materials can be used for the different elements of an ultrasonic thermometer in accordance with the present invention. A specific embodiment of the present invention which also serves as a preferred embodiment incorporates a tungsten-2% thoria transmission line and small sections of thin tungsten-26% rhenium wire as the isolation standoffs. The invention of course is not limited to the use of these materials as a wide variety of other materials are equally adaptable.

In one embodiment of the present invention, the standoffs are made from 5-mil thick tungsten-26% rhenium thermocouple wire while the transmission line is 15-mil thick tungsten-2% thorium dioxide wire. The standoff wire is butted perpendicular to the transmission line and welded by a burst of laser energy, and the standoff wire is cut off to the appropriate length by the laser by using a higher burst of energy. The transmission line is then rotated 120° and another standoff is welded on in accordance with the above procedure. After each group of three standoffs is welded onto the transmission line, the group is passed through a 35-mil diameter opening to ensure proper length to permit clearance when the transmission line is inserted into the protective sheath.

While the standoffs can be placed along the transmission line at any desired location at which a signal echo is desired or a noise echo can be tolerated, it has been found that, since in a preferred embodiment the sensor element is about 2 inches long, it is preferred that the isolation standoffs be spaced about 2 inches apart along the transmission line. The signals generated by the standoffs located at these points will not interfere with the signal echoes from the sensor element.

While the invention has been described with reference to preferred embodiments and with mention of specific materials, it should be understood that the invention is not so limited but is equally applicable to other embodiments and materials as may be included within the spirit and scope of the appended claims. As an example, while the protective sheath was described in the preferred embodiment as being composed of tungsten-26% rhenium, an alternative embodiment would be to employ a protective sheath composed of tantalum. Other materials or variations are also applicable to the present invention.

The embodiments of the invention in which an exclusive property or privilege is claimed are defined as follows:

1. In a high-temperature ultrasonic thermometer which includes an ultrasonic transmission line surrounded by a protective sheath, the improvement therein to minimize sticking of said transmission line to said sheath and prevent noise echoes from interfering with signal echoes comprising: small isolation standoffs mounted on said transmission line to minimize points of contact between said transmission line and said sheath, said isolation standoffs being sections of thin wire mounted on said transmission line at locations where a signal echo is desired.

2. The thermometer of claim 1 wherein said thin wire standoffs are laser-welded perpendicular to said transmission line.

3. The thermometer of claim 4 wherein said transmission line is tungsten-2% thoria and said standoffs are tungsten-26% rhenium.

4. The thermometer of claim 1 wherein adjacent standoffs are mounted about the circumference of said transmission line approximately 120° apart.

5. A method for minimizing the sticking of an ultrasonic thermometer transmission line and sensor to the inside surface of the surrounding protective sheath and preventing noise echoes from interfering with signal echoes comprising: mounting small isolation standoffs on said transmission line to minimize the points of contact between said transmission line and said sheath, said standoffs being sections of thin wire, and said standoffs being mounted on said transmission line at locations where a signal echo is desired.

6. The method of claim 5 further comprising laser-welding said standoffs perpendicular to said transmission line such that adjacent standoffs are mounted approximately 120° apart about the circumference of said transmission line.

* * * * *